United States Patent
Antikidis et al.

(10) Patent No.: US 8,559,870 B2
(45) Date of Patent: Oct. 15, 2013

(54) METHOD AND SYSTEM FOR ACQUIRING AND REPATRIATING SATELLITE DATA

(75) Inventors: Jean-Pierre Antikidis, Castanet (FR); Jean-Jacques Favier, Montastruc la Conseillere (FR)

(73) Assignee: Centre National d'Etudes Spatiales, Paris (FR)

( * ) Notice: Subject to any disclaimer, the term of this patent is extended or adjusted under 35 U.S.C. 154(b) by 253 days.

(21) Appl. No.: 13/061,194

(22) PCT Filed: Aug. 20, 2009

(86) PCT No.: PCT/FR2009/051613
§ 371 (c)(1),
(2), (4) Date: Apr. 12, 2011

(87) PCT Pub. No.: WO2010/023396
PCT Pub. Date: Mar. 4, 2010

(65) Prior Publication Data
US 2011/0206096 A1    Aug. 25, 2011

(30) Foreign Application Priority Data
Aug. 28, 2008 (FR) ...................... 08 04744

(51) Int. Cl.
    H04B 7/185    (2006.01)
(52) U.S. Cl.
    USPC ...................... 455/12.1; 455/404.2
(58) Field of Classification Search
    USPC ........................... 455/3.02, 3.06, 7
    See application file for complete search history.

(56) References Cited

U.S. PATENT DOCUMENTS

| 2004/0192189 A1* | 9/2004 | Yuhara et al. ................ 455/3.02 |
| 2004/0215931 A1 | 10/2004 | Ellis |
| 2005/0122260 A1* | 6/2005 | Dunas et al. ............. 342/357.02 |

FOREIGN PATENT DOCUMENTS

| CN | 1988590 A | 6/2007 |
| DE | 20014110 U1 | 2/2001 |
| EP | 0767011 A1 | 4/1997 |
| FR | 2927983 A1 | 8/2009 |
| GB | 2432486 | 5/2007 |

OTHER PUBLICATIONS

International search report dated Dec. 21, 2009 in corresponding PCT/FR2009051613.
International Search Report, dated Jun. 25, 2010, in Application No. PCT/FR2009/051441.
International Preliminary Examination Report in Application No. PCT/FR2009/051441.
Chinese Search Report, dated May 28, 2013, from corresponding CN application.

* cited by examiner

Primary Examiner — Tu X Nguyen
(74) Attorney, Agent, or Firm — Young & Thompson

(57) ABSTRACT

A method of acquiring and repatriating satellite data representative of a zone in space, termed the target zone, and an instrument for acquiring and repatriating satellite data including a plurality of satellites (1, 100), a plurality of terrestrial receiving stations (50, 51, 52, 53, 54), the instrument includes, for each item of data received by a receiving station (50, 51, 52, 53, 54), termed the receiving station, originating from the space layer: elements for determining a receiving station (50, 51, 52, 53, 54) intended for storing this item of data, termed the receiving station competent in respect of this item of data, and a terrestrial digital network for routing this item of data from the station receiving this item of data to the receiving station competent in respect of this item of data.

18 Claims, 5 Drawing Sheets

METHOD AND SYSTEM FOR ACQUIRING AND REPATRIATING SATELLITE DATA

The invention concerns a process for acquisition and downloading of satellite data that are representative of a zone of space. The invention also concerns an instrument for acquisition and downloading of satellite data that are representative of a zone of space. More particularly, the invention concerns a process for downloading of images to the Earth and an instrument for terrestrial observation.

BACKGROUND OF THE INVENTION

An instrument for terrestrial observation is known comprising:
- a constellation of satellites, named the spatial layer for acquisition of images, each satellite being equipped with at least one optical device for acquisition of images of portions of the terrestrial globe and including at least one module for transmission of the acquired images to a terrestrial layer,
- a plurality of receiving stations distributed over the surface of the globe, named the terrestrial layer, each receiving station including at least one module for receiving images stemming from the spatial layer.

The SPOT constellation of satellites constitutes such an instrument. This constellation comprises a plurality of satellites placed in a heliosynchronous, circular, polar orbit and in phase in relation to the Earth. Each satellite has a cycle of 26 days. Each satellite includes optical instruments, data recorders and systems for transmission of the images to receiving stations on the ground. The optical instruments are suitable to ensure parameterisable oblique aims, so that the same region can be observed several times in the course of the cycle of 26 days. The data recorders enable the images to be stored on board if the satellite is not in the line of sight of a ground station. When a satellite is in the line of sight of a ground station, it transmits, by means of a module for transmission of images, the images stored in the on board recorders to the ground station. Each ground station, in turn, then transmits the images to a central server for processing and storage of the images. The same occurs with many other known instruments, for example the Landsat constellation.

One drawback of such an instrument lies in the cost of manufacture, installation, management and maintenance of the constellation of satellites, of the ground stations and of the central server. In particular, such an instrument necessitates the installation and management on the ground of a plurality of ground stations operated in autonomous manner in relation to one another and suitable to send the received images to a central server for backup of the images in a view of their distribution to users.

Furthermore, such an instrument comes up against a major practical difficulty in the case where it is sought to obtain a coverage of the whole of the terrestrial globe by images that exhibit a spatial resolution of the order of one meter and a frequency of global coverage of the order of one day. Such a coverage compels management by the central server of around 1500 terabytes of data per day, that is to say, 170 gigabytes per second, largely exceeding the capacities of satellite transmission and ground processing that are attainable with the technologies and architectures of the servers currently available.

The invention aims to overcome these drawbacks and to provide an instrument for acquisition and downloading of satellite data that enables the acquisition and downloading of a large amount of data.

The invention also aims to provide such an instrument that does not necessitate a central server for processing and backup of the data.

SUMMARY OF THE INVENTION

To this end, the invention concerns an instrument for acquisition and downloading of satellite data that are representative of a zone of space, named the target zone, including:
- a plurality of satellites, named the spatial layer for acquisition of data, each satellite being equipped with at least one device for acquisition of data pertaining to at least one portion of said target zone, and with means for transmission of the acquired data to the ground,
- a plurality of terrestrial receiving stations, named the terrestrial layer, each receiving station including a receiving module for receiving data and storage means for storage of data, wherein it includes:
- for each datum received by a receiving station, named the receiver station, and emanating from said spatial layer, means for determination of a receiving station intended to store this datum, named the competent receiving station for this datum,
- a terrestrial digital network interlinking the receiving stations with each other, so that a datum received by a receiver station that is not the competent receiving station for this datum can be routed by means of this terrestrial digital network to the competent receiving station for this datum if said receiver station for this datum is not said competent receiving station for this datum.

Throughout the text, and for each datum stemming from the spatial layer, a receiving station is said to be the receiver for this datum if it receives this datum directly from one of the satellites of the spatial layer, and a receiving station is said to be competent for this datum if this datum is intended to be stored by this receiving station. And to be kept stored by this competent receiving station. Satellite datum stemmed from the spatial layer are thus stored in a distributed form within the different competent receiving stations, and in particular they are not centralized in a central site as in the prior instruments such as Spot or Landsat. A receiving station may be receiver station and competent receiving station for a datum in the case where the receiving station that directly receives the datum from the spatial layer is also intended to store this datum.

The terrestrial digital network constitutes means for routing each datum from a receiver station to the competent receiving station for this datum.

An instrument according to the invention enables a downloading of data from the spatial layer to the terrestrial layer which may be not only direct—a satellite sends the acquired datum directly to the competent receiving station for storing this image—but also indirect—a satellite sends an acquired datum to a receiving station that is not competent for this datum, and the terrestrial digital network then enables this datum to be routed from this non-competent receiver station to the receiving station that is competent for this datum.

Such a mixed downloading of data—direct and indirect—makes it possible for each datum acquired by the spatial layer to follow a non-systematic opportunist path. In other words, if the datum can be downloaded along a direct path to its competent receiving station for this datum—taking account, notably, of the load of this receiving station, its condition (in working condition or otherwise), the atmospheric conditions, etc.—the datum takes this direct path between the satellite and this competent receiving station. On the other hand, if direct downloading is not possible the datum then takes an indirect path constituted by a transfer between the satellite and a receiver station and a subsequent transfer between the receiver station and the competent receiving station for this datum by means of the terrestrial digital network.

Advantageously and according to the invention, the terrestrial digital network is a public digital network. Such a network is advantageously IP-compatible and is, for example, the Internet network. The ground link between the receiver station of a datum for which it is not competent and the competent receiving station therefore advantageously utilises the principle of the IP protocol. The datum is circulated over the network and is propagated from station to station until a receiving station recognises this datum as a datum for which it is competent and which is therefore intended for it.

For each datum received by the terrestrial layer, means for determination of a competent receiving station for this datum designate such a competent receiving station. These determination means may be of all types. They may, for example, determine the competence of a station as a function of a characteristic that is peculiar to the datum, each station being competent for data exhibiting certain common peculiar characteristics. For example, the characteristic of the datum determining competence may be a characteristic linked to the geographical zone covered by this datum, so that a competent receiving station for this characteristic will receive, directly or indirectly, all the data corresponding to this zone. The characteristic of the datum determining competence may also be a characteristic linked to the type of instrument having acquired this datum, so that a competent receiving station for these data will receive, directly or indirectly, all the data acquired by instruments of this type. In the case of image data the characteristic of the datum determining competence may be linked to a mean level of grey of the image, to a predetermined range of spatial frequencies, to a predetermined texture, and in general manner to all types of characteristics capable of being extracted from an image by image-processing means. In this case all the images exhibiting similar mean levels of grey, similar spatial frequencies, similar textures, etc. are routed, directly or indirectly, to the same competent receiving station. The characteristic determining competence may also correspond to a date and/or to a time of acquisition of the datum, so that, for example, all the data acquired in the same time-slot each day are routed to the same receiving station in order to be stored by this competent receiving station. In general manner, the determination means make it possible to distinguish the data received by the terrestrial layer in such a manner that the data exhibiting similar peculiar characteristics are stored by the same receiving station. Advantageously and according to the invention, the competence of a receiving station is a function of a geographical zone covered by the data. This zone is a portion of the target zone, of which the instrument according to the invention acquires and downloads data. This geographical zone which determines the competence of a receiving station is named the circle of visibility of this receiving station. This zone is not necessarily continuous, so a receiving station may be competent for a set of geographical zones that are disjoint from one another.

Said determination means may be physically distinct from the receiving stations. Thus they may, for example, include a central server that is linked to the set of the receiving stations of the terrestrial layer and that is suitable to establish, for example from a correspondence table, the competent receiving station for each datum, taking account of a characteristic linked to this datum.

Nevertheless, advantageously and according to the invention, said determination means include, for each receiving station:
  characteristic data defining a not necessarily continuous portion of said target zone, named the circle of visibility of this receiving station, for which this receiving station is the competent receiving station,
  a selection module for selection of data received by said receiving module of said receiving station, which is configured to select the data that pertain to said circle of visibility of said receiving station and to circulate over said terrestrial digital network all the data received by its receiving module that are not selected by said selection module.

According to this embodiment variant, said determination means are, at least in part, localised in each receiving station. In particular, each receiving station includes a module for selection of data received by the receiving module of this receiving station, which is suitable to select the data that correspond to the circle of visibility of this station. If the datum received by this station is not within its competence, then this datum is placed onto the terrestrial digital network interlinking the receiving stations with each other so that it can be routed to the competent receiving station for this datum. According to this variant, the receiving module of each receiving station is suitable not only to receive the data directly from the spatial layer but also to receive the data from the terrestrial digital network, so that the selection module can also analyse the data stemming from the digital network in order to define whether this datum is within the competence of this receiving station or has to be replaced onto the network. In this way this datum is conveyed, step by step, over the terrestrial digital network until it reaches its competent receiving station.

According to another variant, and as pointed out previously, a selection module can select the data as a function of characteristics other than their membership of the circle of visibility of the station, such as, for example, the instrumental origin of this datum, the time of acquisition, etc.

In the case where the competence is a function of the geographical zone covered by the datum, advantageously and according to the invention each receiving station includes, in a memory that can be accessed by said selection module, the characteristic data that define said circle of visibility of this receiving station. The circle of visibility is defined locally in each receiving station.

In addition, an instrument according to the invention advantageously includes, for each receiving station, means for remote access to said memory of this receiving station which includes said characteristic data that define said circle of visibility of this receiving station. According to this variant, an operator may, if necessary, easily remotely redefine the competence of each receiving station by modifying the characteristic data that define the circle of visibility of this receiving station and therefore its competence. This may, for example, be useful in case of addition to the instrument of one or more receiving stations with a view, notably, to distributing the acquired data better among all the receiving stations of the terrestrial layer. This may also be useful in case of a redefinition of the target zone observed by the instrument that would have the consequence of enlarging the zone observed by the instrument and therefore of increasing the amount of data transmitted to the terrestrial layer.

This target zone may be of all types. In particular, an instrument according to the invention can be used for the acquisition and downloading of images of the celestial canopy. According to this embodiment, the satellites carry instruments for acquisition of images, and each instrument is oriented towards the stars in such a way as to acquire a zone of the sky. The images can then be downloaded to the terrestrial layer and can be distributed as a function of the zone of the universe covered by each image. According to this embodiment, a receiving station may be competent for all the images that correspond to a given galaxy or to a type of particular celestial objects being observed, etc.

Advantageously and according to the invention, the target zone is the terrestrial globe. According to this embodiment, the instrument is an instrument for acquisition and downloading of observation data pertaining to the earth.

The data stemming from said spatial layer are preferably digital images. Such an instrument enables the acquisition and downloading of images of the terrestrial globe. According to this embodiment, the competence of a receiving station is preferably associated with a zone of the globe.

According to this embodiment, a mixed downloading of the images enables the instrument to acquire images of zones that do not include a receiving station, such as sea zones, while enabling their downloading to a competent receiving station for these zones. Such a competent receiving station exhibits a circle of visibility that encompasses all or some of the images of the sea. This also makes it possible to attribute to a given receiving station, for example the competent station for the images of Paris, the processing and accommodation of the images of Corsica. In other words, competence for Corsica is attributed to the competent receiving station for Paris. Consequently, all the images of Corsica are routed to the competent station for Paris by an indirect downloading.

According to this variant, each received image is transmitted to a selection module that is suitable to determine whether or not this image is an image that pertains to the circle of visibility of this receiving station. The determination of this membership may be effected in various ways. Nevertheless, advantageously and according to the invention, the selection module for selection of images of each receiving station includes means for reading the header of each image that are suitable to read the data that are representative of the spatial and temporal coordinates of this image. These spatial and temporal coordinates of the image are inserted into the header of the image by the satellite that captures the image. In fact, each satellite of the spatial layer knows the time at which the image is acquired by its device for acquisition of images, as well as the coordinates of the image that it acquires.

According to this embodiment, each receiving station stores locally the images for which it is competent.

To a receiving station of an instrument according to the invention there may be attributed in this way the processing and backup of zones of the globe that are geographically remote from the physical location of the receiving station. The corresponding images are routed to the competent station by an indirect downloading as described above. In this way, the parameterisation of the circle of visibility of a receiving station enables this station to be rendered competent for any zone of the globe. In addition, with an instrument according to the invention it is easy to change the competence of a receiving station. This changing of competence consists in changing the definition of its circle of visibility—that is to say, in modifying the data, stored in said memory which can be accessed by the selection module, that are representative of the circle of visibility.

The invention also concerns a process for acquisition and downloading of satellite data pertaining to a zone of space, named the target zone, in which:

data are acquired by a constellation of satellites, named the spatial layer, each satellite being equipped with at least one device for acquisition of data, the data are transmitted to a plurality of receiving stations distributed over the surface of the globe, named the terrestrial layer, each receiving station including at least one receiving module for receiving data and storage means for storage of received data, wherein, for each datum received by a receiving station, named the receiver station, and emanating from said spatial layer:

a receiving station intended to store this datum, named the competent receiving station, is determined by determination means, this datum is stored by said storage means of said receiver station of this datum if this receiver station is the competent station for this datum, this datum is routed, by means of a terrestrial digital network interlinking the receiving stations with each other, from said receiver station to said competent receiving station for this datum if said receiver station of this datum is not said competent receiving station for this datum.

A process for acquisition and downloading of data according to the invention enables a downloading of the data from the spatial layer to a receiving station of the terrestrial layer that may be direct or indirect.

According to a variant of the invention, the process according to the invention concerns the acquisition and downloading of terrestrial observation images. According to such a process for acquisition and downloading of images of the terrestrial globe:

images of the globe are captured by a constellation of satellites, each satellite being equipped with at least one optical device for acquisition of images and including at least one module for transmission of images, the images are transmitted to a plurality of receiving stations distributed over the surface of the globe, each receiving station including at least one module for receiving images, characterised in that:

each image received by a receiving module of a receiving station is analysed by a selection module that is configured to select an image of a predetermined geographical zone, named the circle of visibility of the receiving station, each image not selected by said selection module is transmitted to a terrestrial digital network that interlinks the receiving stations, so that it can reach the competent receiving station for this image by a ground link.

Advantageously and according to the invention, for each receiving station, characteristic data define a not necessarily continuous portion of said target zone, named the circle of visibility of this receiving station, for which this receiving station is competent, data received by said receiving module of this receiving station are selected by a selection module if these data pertain to said circle of visibility of this station, and are circulated over said terrestrial digital network if they are not selected by said selection module.

Advantageously and according to the invention, said characteristic data defining said circle of visibility of each receiving station are stored in a memory that can be accessed by said selection module of this receiving station.

Advantageously and according to the invention, for each receiving station said memory of this receiving station, which includes said characteristic data that define said circle of visibility of this receiving station, is accessible remotely by means for remote access.

Advantageously and according to the invention, said terrestrial digital network is a public digital network.

Advantageously and according to the invention, said target zone is the terrestrial globe.

Advantageously and according to the invention, said data stemming from said spatial layer are digital images.

Advantageously and according to the invention, for each image received by each receiving station, data that are representative of the spatial and temporal coordinates of this image which are stored in the header of the image received by said selection module of this receiving station are read by reading means.

The invention also concerns an instrument for acquisition and downloading of satellite data and a process for acquisition and downloading of satellite data, characterised in combination by all or some of the characteristics mentioned above or below.

BRIEF DESCRIPTION OF THE DRAWINGS

Other objectives, characteristics and advantages of the invention will become apparent from the following description which is given solely by way of non-limiting example and which refers to the appended Figures, in which.

In the Figures, the scales and the proportions are not strictly respected, for purposes of illustration and clarity.

DETAILED DESCRIPTION OF THE PREFERRED EMBODIMENTS

Figure 1:
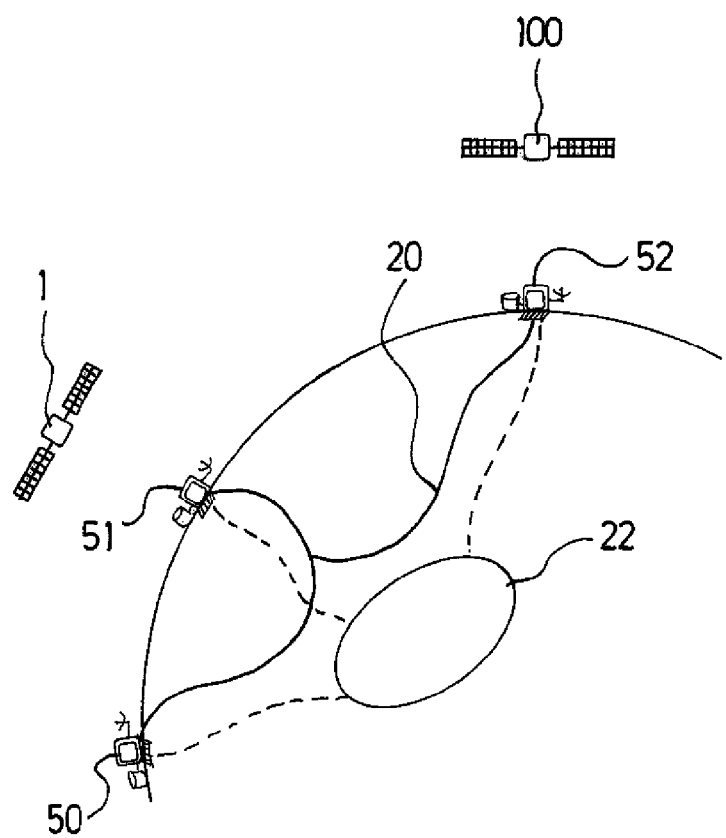
FIG. 1 is a schematic view of a portion of an instrument for acquisition and downloading of satellite data according to an embodiment of the invention.

FIG. 1 is a very schematic view of a portion of an instrument according to the invention. In this Figure, an instrument for acquisition and downloading of satellite data that are representative of a zone of space, named the target zone, includes a plurality of satellites 1, 100 and a plurality of terrestrial receiving stations 50, 51, 52. In addition, such an instrument includes, for each datum received by a receiving station 50, 51, 52, determination means 22 for determination of a receiving station 50, 51, 52 intended to store this datum, named the competent receiving station for this datum, and means for routing this datum from said receiver station of this datum to said competent receiving station for this datum. These routing means are constituted by a terrestrial digital network 20. Such a terrestrial digital network 20 ensures the circulation of data between the various stations by essentially terrestrial means. According to a preferential embodiment, this terrestrial digital network 20 is a public digital network such as the Internet network.

The determination means 22 may be of all types. They may, for example, determine the competence of a station as a function of a characteristic that is peculiar to the datum, each station being competent for data exhibiting certain common peculiar characteristics. In addition, these determination means 22 may be physically distinct from the receiving stations. Thus they may, for example, include a central server linked to the set of the receiving stations and suitable to establish, for example from a correspondence table, the competent receiving station for each datum, taking account of a characteristic linked to this datum. According to a preferential embodiment represented notably in FIG. 5, these determination means 22 are incorporated into each receiving station and include, for each receiving station 50, 51, 52, 53, 54, characteristic data defining a portion of said target zone, named the circle of visibility of this receiving station, for which this receiving station is competent, and a selection module 11 for selection of data received by a receiving module 12 of this station that is suitable to select the data that pertain to said circle of visibility of this station and to supply to the digital network 20 all the data received by its receiving module that are not selected by said selection module, so that they can be routed to their corresponding competent receiving station.

The embodiment shown in the Figures concerns an instrument for acquisition and downloading of images of observation of the terrestrial globe. Starting from this embodiment that has been described, a person skilled in the art will be able, without difficulty, to realise an instrument for acquisition and downloading of other types of data, such as, for example, radar data pertaining to celestial objects.

According to this embodiment, each satellite includes at least one optical device 2 for acquisition of images and a module 4 for transmission of images to the ground. The optical device 2 for acquisition of images may be of all known types. Nevertheless, according to a preferential embodiment such an optical device 2 is a camera with fixed aim oriented towards the Earth and suitable to acquire multispectral images of the terrestrial regions that this satellite 1 overflies. Such an optical device 2 with fixed aim does not therefore, by definition, permit losses of aim. A satellite 1 of an instrument according to the invention therefore does not necessitate a particular aiming programme, significantly reducing the costs of manufacture and maintenance.

The satellites 1 may, for example, be optical parachutes. These satellites 1 preferably exhibit a low orbit, so that they can describe a large number of orbits in one day. Each satellite 1 of an instrument according to the invention preferably executes more than one orbit in one day. According to an embodiment of the invention, each satellite 1 executes sixteen orbits in one day.

The transmission module 4 for transmission of images of a satellite 1 of an instrument according to the invention is suitable to transmit the images to the ground.

Such a transmission module 4 may be of all known types and is not described here in detail. According to a particularly advantageous embodiment of the invention, each satellite 1 includes, as represented in FIG. 5, a compression module 3 for compression of images, which is arranged between the device 2 for acquisition of images and the module 4 for transmission of images to a receiving station 50, so that each image acquired by the device 2 for acquisition of images can be compressed by this compression module 3 before being transmitted to the Earth by the module 4 for transmission of images.

Each receiving station 50, 51, 52, 53, 54 includes, according to a preferential embodiment of the invention, a module 10 for receiving images, a module 11 for selection of images, and a memory 12 that can be accessed by the selection module 11. This memory 12 includes data that are representative of the geographical zones that constitute the circle of visibility of this receiving station and therefore make it possible to parameterise this circle of visibility. A receiving station is said to be competent for a received image if it corresponds to a geographical zone defined by the data of the memory 12. Moreover, each receiving station 50, 51, 52, 53, 54, 55, 56 includes storage means 13 for storage of the received images that are part of the circle of visibility of this receiving station. These storage means 13 may be of all types, for example a mass memory such as a disc memory.

According to the invention, the receiving stations 50, 51, 52, 53, 54 are interlinked with each other by a digital network 20, so that each receiving station 50, 51, 52, 53, 54 can circulate over this digital network 20 all the images received by its receiving module 10 that do not correspond to its circle of visibility. The images transmitted over the terrestrial digital network 20 are the images that are not selected by the selection module 11. In addition, these non-selected images are not stored by the storage means 13 of this receiving station 50, 51, 52, 53, 54.

Figure 2:
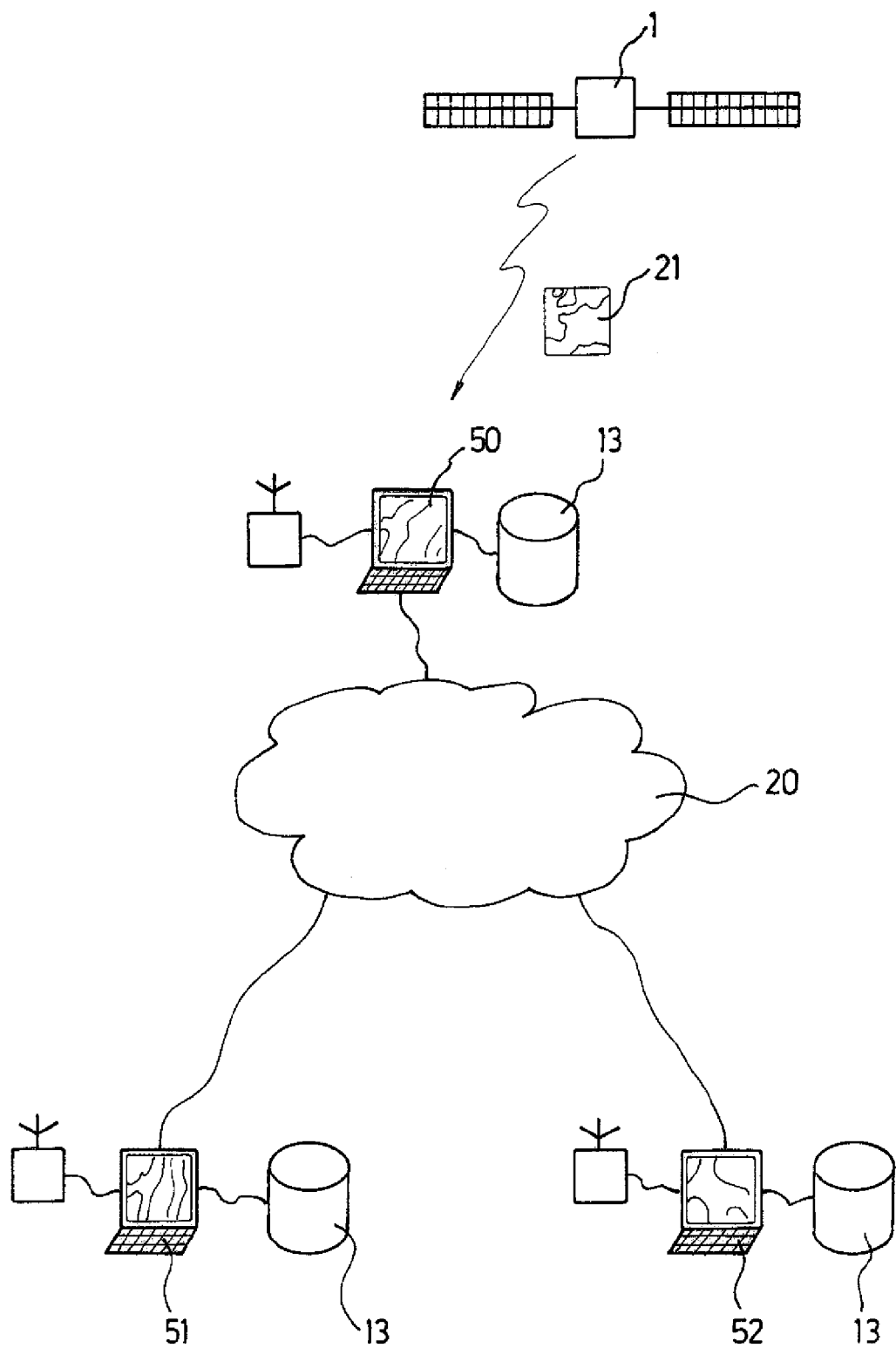
FIG. 2 is a schematic view according to another representation of an instrument for observation of the terrestrial globe according to an embodiment of the invention.
Figure 5:
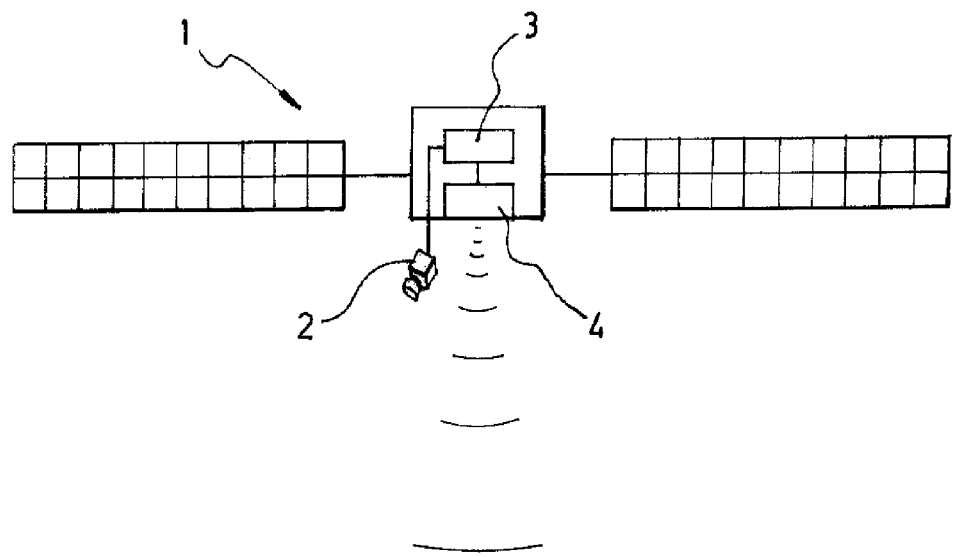
FIG. 5 is a schematic view of a satellite and of a receiving station of an instrument according to an embodiment of the invention.
Figure 5:
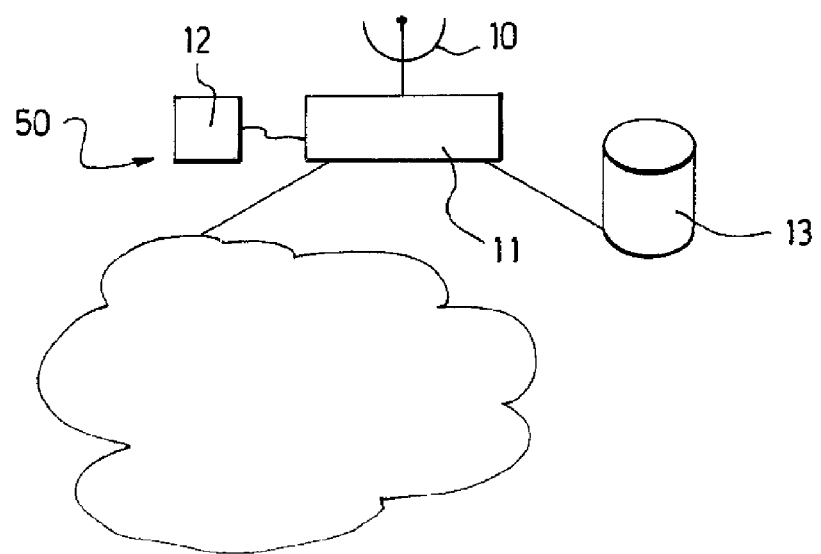

In FIG. 2 a satellite 1 which has accomplished the acquisition of an image 21 of a portion of the terrestrial globe transmits the acquired image 21 to a receiving station 50 represented schematically in FIG. 5. When this image 21 is received by the receiving module of this receiving station 50, it is transmitted to the selection module 11. This selection module 11 determines, for example by reading the header of the image 21, the geographical zone that corresponds to this image 21, as well as the period in which this image was captured by a satellite 1. In order to do this, the selection module 11 includes means for reading the header of each image received by the receiving module 10. The selection module 11 then determines whether this image pertains to the circle of visibility of this receiving station 50. This determination is accomplished, according to this embodiment, by accessing the memory 12 of this receiving station, which contains the list of all the regions of the world for which this station is competent. If receiving station 50 is competent for this image 21, the selection module 11 orders the storage of the image 21 by the storage means 13 of this station 50. On the other hand, if the selection module 11 determines that receiving station 50 is not competent for this image 21, it orders the placing of this image onto the public digital network 20. Each station 51, 52 linked to this digital network 20 then determines, when the image 21 reaches it, whether or not said image pertains to its circle of visibility. As soon as a receiving station determines that the image 21 is returning to it, it stores said image by means of its storage means 13, otherwise it allows said image to circulate over the terrestrial digital network 20.

Figure 3:
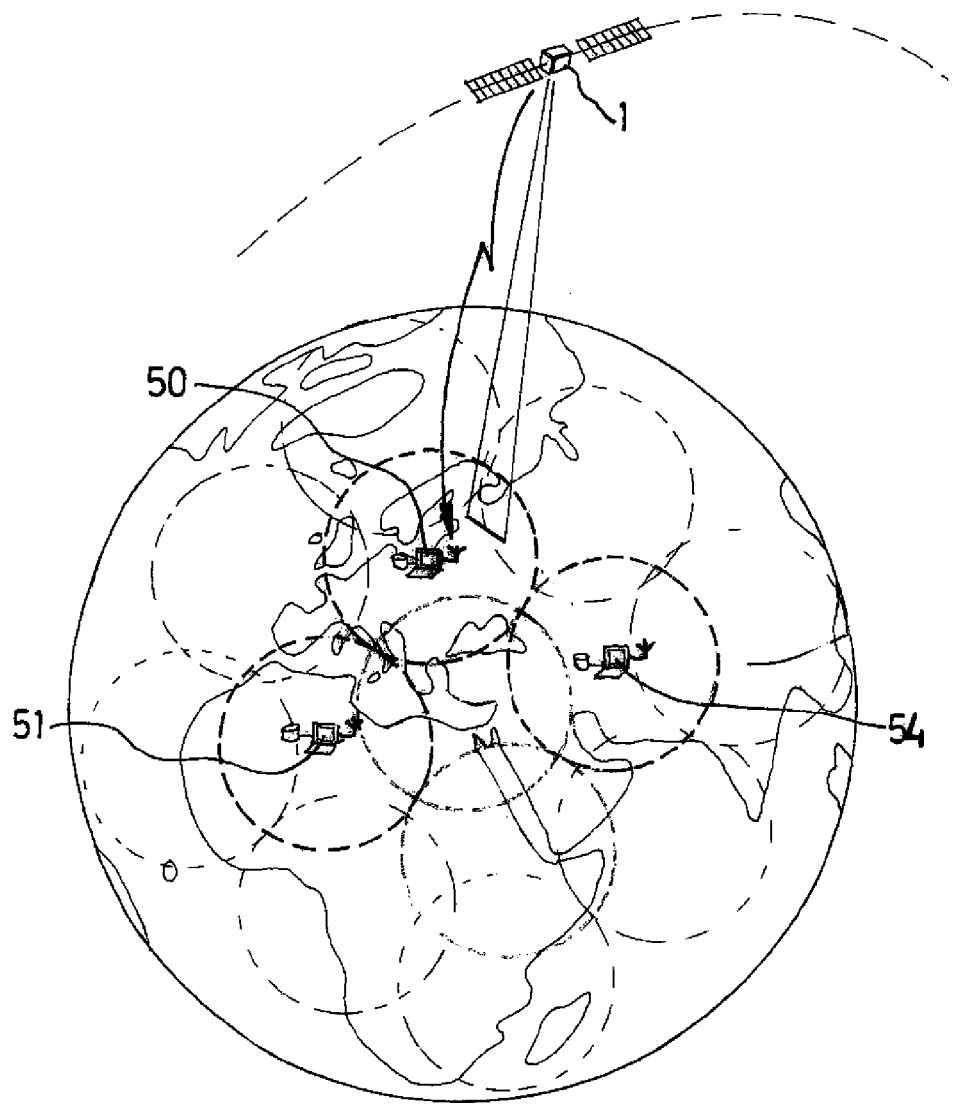
FIG. 3 is a schematic view of an instrument according to an embodiment of the invention that represents a direct downloading of an image from a satellite to a competent receiving station for this image.

In FIG. 3 a satellite 1 has accomplished the acquisition of an image of a zone of the circle of visibility (represented by dots) of receiving station 50. In this example the circle of visibility of receiving station 50 defines a continuous region around receiving station 50. This image is transmitted directly to receiving station 50, which is therefore competent for this image. Receiving station 50 will therefore store this image by means of its storage means 13.

Figure 4:
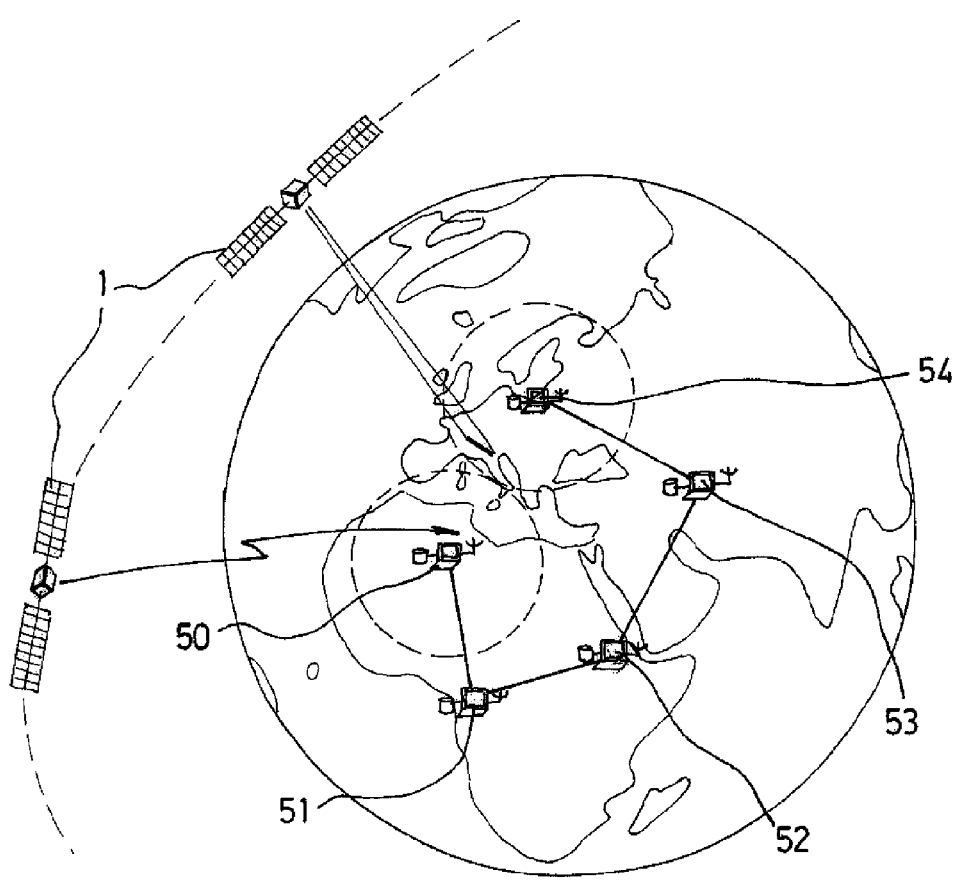
FIG. 4 is a schematic view of an instrument according to an embodiment of the invention that represents an indirect downloading of an image from a satellite to a competent receiving station for this image by means of receiving stations that are not competent for this image.

In FIG. 4 a satellite 1 has accomplished the acquisition of an image of a zone of the circle of visibility of receiving station 54. FIG. 4 illustrates the case where the satellite 1 has not been able to transmit the acquired image directly to the competent receiving station 54 for this image. Such a case may occur, for example, when receiving station 54 is out of order or in the process of maintenance, or when receiving station 54 is already about to receive an image emanating from another satellite, or when receiving station 54 is no longer in the line of sight of the satellite, etc. In such a case the satellite 1 transmits the image to another receiving station 50, which is not competent for this image. Since the selection module of this receiving station 50 has not selected the received image, receiving station 50 transmits the image over the terrestrial digital network. In FIG. 3 the image successively transits receiving station 51, receiving station 52, receiving station 53, in order to be recognised by receiving station 54 and in this way to be backed up by the storage means 13 of receiving station 54.

As the acquisitions of images realised by the satellites proceed, each receiving station constitutes a base of images that are representative of its circle of visibility as defined by the data appearing in its memory 12. Each image of this base of images is defined, for example, by spatial coordinates and by a temporal coordinate. These spatial and temporal coordinates are, according to an advantageous embodiment, the data that appear in the header of the image and that enable each selection module to determine whether or not the image is within its competence. According to an advantageous embodiment of the invention, one or more images stemming from one or more sources may correspond to a triplet of spatial and temporal coordinates. In particular, an instrument according to this embodiment of the invention may include, besides the satellites of the spatial layer, terrestrial cameras, such as webcams, that are suitable to acquire an image and to transmit it by means of the digital network 20 to a competent receiving station, taking account of the spatial and temporal coordinates of the image in question. An instrument according to the invention may also include other devices for acquisition of images, which are arranged on board other aircraft or even arranged at the top of terrestrial buildings, such as apartment buildings, and can transmit the acquired images to the receiving stations.

An instrument according to the invention enables any device connected to the digital network 20 to access the receiving stations and therefore the images stored in the storage means of these receiving stations. According to an advantageous embodiment, the images can be directly accessed by the Internet network, so that any search engine can access an image of a given region. In order to do this, the images can be archived with a name according to a predetermined format that represents the spatial and temporal coordinates of the image. Moreover, a user who is seeking an image of a given region captured by an instrument according to the invention does not need to know which receiving station is accommodating the image that he/she is seeking. The distribution of the images of the globe that are captured by an instrument according to the invention among the various receiving stations is transparent from the point of view of the person who is seeking an image.

Advantageously, an instrument according to the invention implements a process according to the invention. A process according to the invention is advantageously implemented by an instrument according to the invention.

According to other embodiments, an instrument according to the invention acquires and downloads data other than images. In addition, the target zone of the instrument may be a part of space, a part of the terrestrial globe, etc. The characteristic data enabling the acquired data to be distributed among the various receiving stations may be of all types and may be based on a characterisation that is intrinsic to the datum or intrinsic to the acquisition instrument, etc.

The invention claimed is:

1. A process for acquisition and downloading of satellite observation image data representing a zone of space ("the target zone"), comprising:
   acquiring data by a constellation of satellites ("the spatial layer"), each satellite being equipped with at least one device for acquisition of data; and
   transmitting the data to a plurality of receiving stations distributed over the surface of the Earth ("the terrestrial layer"), each receiving station including at least one receiving module for receiving satellite observation image data and storage means for storage of received satellite observation image data,
   wherein, for each satellite observation image datum received by a receiving station ("the receiver station") and emanating from the spatial layer:
      a receiving station, that stores the satellite observation image datum ("the competent receiving station"), is determined by determination means,
      said satellite observation image datum is stored by said storage means of the receiver station of said satellite observation image datum if the receiver station is the competent receiving station for said satellite observation image datum, and
      said satellite observation image datum is routed, by means of a terrestrial digital network interlinking the receiving stations with each other, from the receiver station to the competent receiving station for said satellite observation image datum if the receiver station of said satellite observation image datum is not the competent receiving station for said satellite observation image datum.

2. The process as claimed in claim 1, wherein, for each receiving station,
   characteristic data define a not necessarily continuous portion of the target zone ("the circle of visibility of the receiving station"), for which the receiving station is competent,
   satellite observation image data received by the receiving module of the receiving station are selected by a selection module if said satellite observation image data represent a zone of space pertaining to the circle of visibility of the receiving station, and are circulated over the terrestrial digital network if said satellite observation image data are not selected by said selection module.

3. The process as claimed in claim 2, wherein said characteristic data defining the circle of visibility of each receiving station are stored in a memory that can be accessed by said selection module of the receiving station.

4. The process as claimed in claim 3, wherein, for each receiving station, said memory of the receiving station, which includes said characteristic data that define the circle of visibility of the receiving station, can be accessed remotely by means for remote access.

5. The process as claimed in claim 1, wherein said terrestrial digital network is a public digital network.

6. The process as claimed in claim 1, wherein the target zone is the terrestrial globe, said satellite observation image data being satellite Earth observation image data.

7. The process as claimed in claim 2, wherein said satellite observation image data stemming from the spatial layer are digital images.

8. The process as claimed in claim 7, wherein, for each satellite observation image data received by each receiving station, data that are representative of the spatial and temporal coordinates of the image which are stored in a header of the satellite observation image data received by said selection module of the receiving station are read by reading means.

9. An instrument for acquisition and downloading of satellite observation image data representing of a zone of space ("the target zone") that comprises
   a plurality of satellites ("the spatial layer") for acquisition of satellite observation image data, each satellite being equipped with at least one device for acquisition of satellite observation image data representing at least one portion of the target zone, and with means for transmission of the acquired satellite observation image data to the ground, and
   a plurality of terrestrial receiving stations ("the terrestrial layer"), each receiving station including a module for receiving satellite observation image data stemming from said spatial layer and means for storage of satellite observation image data stemming from said spatial layer,
   said instrument comprising:
   means for determining, for each satellite observation image data received by a receiving station ("the receiver station") and emanating from said spatial layer, a receiving station for storing said satellite observation image data (a "competent receiving station"); and
   a terrestrial digital network interlinking the receiving stations with each other, wherein satellite observation image data received by a receiver station that is not the competent receiving station for said satellite observation image data is routed by means of the terrestrial digital network to the competent receiving station for said satellite observation image data.

10. The instrument as claimed in claim 9, wherein said means for determining a competent receiving station include, for each receiving station:
   characteristic data defining a not necessarily continuous portion of said target zoned ("the circle of visibility of the receiving station)", for which the receiving station is the competent receiving station, and
   a selection module for selection of satellite observation image data received by said receiving module of the receiving station that is suitable to select the satellite observation image data that pertain to said circle of visibility of the receiving station and to circulate over said terrestrial digital network all the satellite observation image data received by its receiving module not selected by said selection module.

11. The instrument as claimed in claim 10, wherein each receiving station includes, in a memory that can be accessed by said selection module, said characteristic data that define the circle of visibility of the receiving station.

12. The instrument as claimed in claim 11, further comprising:
   for each receiving station, means for remote access to said memory of the receiving station which includes said characteristic data that define the circle of visibility of the receiving station.

13. The instrument as claimed in claim 9, wherein said terrestrial digital network is a public digital network.

14. The instrument as claimed in claim 9, wherein the target zone is the terrestrial globe, said satellite observation image data being satellite Earth observation image data.

15. The instrument as claimed in claim 10, wherein said satellite observation image data stemming from the spatial layer are digital images.

16. The instrument as claimed in claim 15, wherein said selection module for selection of satellite observation image data of each receiving station includes means for reading a header of each satellite observation image data that are suitable to read data that are representative of the spatial and temporal coordinates of said satellite observation image data.

17. The instrument as claimed in claim 9, wherein said satellite observation image data stemming from the spatial layer are digital satellite observation image data.

18. The process as claimed in claim 1, wherein said satellite observation image data stemming from the spatial layer are digital satellite observation image data.

\* \* \* \* \*

UNITED STATES PATENT AND TRADEMARK OFFICE
CERTIFICATE OF CORRECTION

PATENT NO. : 8,559,870 B2  Page 1 of 1
APPLICATION NO. : 13/061194
DATED : October 15, 2013
INVENTOR(S) : Antikidis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 298 days.

Signed and Sealed this

Fifteenth Day of September, 2015

Michelle K. Lee
*Director of the United States Patent and Trademark Office*